US005113107A

United States Patent [19]

Atsumi et al.

[11] Patent Number: 5,113,107

[45] Date of Patent: May 12, 1992

[54] ROTARY ACTUATOR

[75] Inventors: Masaaki Atsumi, Shizuoka; Haruhiko Uchiyama, Toyohashi, both of Japan

[73] Assignee: Asmo Co., Ltd., Kosai, Japan

[21] Appl. No.: 676,793

[22] Filed: Mar. 28, 1991

[30] Foreign Application Priority Data

Apr. 20, 1990 [JP] Japan ................................ 2-106263

[51] Int. Cl.[5] .......................... H02K 1/12; H02K 5/00

[52] U.S. Cl. .................................... 310/256; 310/254; 310/89; 310/49 R; 310/231

[58] Field of Search ..................... 310/256, 152, 49 R, 310/40 MM, 30, 254, 257, 89, 231

[56] References Cited

U.S. PATENT DOCUMENTS 4,200,971 5/1980 Shimizu et al. ..................... 310/266
4,347,457 8/1982 Sakamoto ............................ 310/256
4,558,293 12/1985 Haneda et al. ........................ 310/30
4,841,190 6/1989 Matsushita et al. ................ 310/257
4,893,038 1/1989 Miyzawa ................................ 310/83
4,970,462 11/1990 Richmond .......................... 324/174

*Primary Examiner*—Steven L. Stephan
*Assistant Examiner*—Matthew Nguyen

[57] ABSTRACT

Disclosed is a rotary actuator having a rotor and a stator which rotatably supports the rotor. The stator includes a coil bobbin, a stator coil, a pair of tapered poles and a yoke. The coil bobbin is formed from a non-magnetic material into a cylindrical shape and has the stator coil wound circumferentially thereabout. The pair of poles are disposed on the internal circumference of the coil bobbin. The yoke covers the outer surface of the coil bobbin and is in contact with the respective poles. The rotor comprises a rotary shaft and a diametrically polarized cylindrical magnet. The rotary shaft is inserted into the coil bobbin and is rotatably supported by the yoke. The magnet is carried by the circumference of the rotary shaft and is rotatable integrally therewith.

16 Claims, 6 Drawing Sheets

ROTARY ACTUATOR

This application claims the priority of Japanese Patent Application No. 2-106263 filed on Apr. 20, 1990 which is incorporated herein by reference

BACKGROUND OF THE INVENTION

1. Field of the Invention

The present invention relates generally to a rotary actuator utilizing a solenoid. More particularly, this invention pertains to a rotary actuator having a rotor rotational range of not more than 180°.

2. Description of the Related Art

A rotary actuator is known which consists of a rotor having a permanent magnet fixed on a rotary shaft and a stator having poles disposed to oppose each other at an interval of 180° with the rotary shaft therebetween (see, e.g., Japanese Unexamined Patent Publication No. 54-34013).

This type of rotary actuator has a stator consisting of a cylindrical coil bobbin with slots extending axially on the circumference thereof. A stator coil is axially wound around the coil bobbin and a cylindrical yoke is fitted to the circumference of the bobbin. The poles are formed to protrude from the internal circumference of the yoke.

The polarity of the poles may be changed by switching the direction that the stator coil is energized. This permits the rotor to be rotated under the magnetic interaction between the rotor and the stator. The described rotary actuator also has two stoppers for limiting the rotational range of the rotor.

However, the stator coil in the above rotary actuator has a hollow coil. That is, the center of the coil has an opening. This opening increases the magnetic reluctance which in turn reduces the magnetic flux density. Accordingly, the rotational torque provided is small relative to the coil current. Thus, a relatively large actuator must be used to provide a designate torque.

Such a rotary actuator suffers several other problems as well. To begin with, it requires the use of a winding machine having a complicated structure since the stator coil must be wound around the coil bobbin in the axial direction. Thus the assembly of the stator is troublesome. Further, the wires connected to the coil ends are easily detached since they are merely secured with an adhesive tape.

Further, the above actuator suffers the disadvantage that two stoppers are required and such stoppers cannot accurately regulate the rotational range of the rotor.

SUMMARY OF THE INVENTION

Accordingly, it is a primary objective of the present invention to provide a rotary actuator which can output a greater torque than conventional actuators by effectively utilizing the magnetomotive force (magnetic force generated by the energization of the coil).

To achieve the foregoing and other objects and in accordance with the purpose of the present invention, an improved rotary actuator is provided. The rotary actuator has a rotor and a stator which rotatably supports the rotor. The stator has a coil bobbin, a stator coil, a pair of tapered poles and a yoke. The coil bobbin is made of a non-magnetic material formed in a cylindrical shape with a stator coil wound circumferentially thereabout. A pair of poles are provided on the internal circumference of the coil bobbin. The yoke encases the coil bobbin and is magnetically connected to each of the poles.

The rotor has a rotary shaft and a diametrically polarized cylindrical magnet. The rotary shaft is inserted into the coil bobbin and is rotatably supported by the yoke. The magnet is provided on the circumference of the rotary shaft and is rotatable integrally with the rotary shaft.

BRIEF DESCRIPTION OF THE DRAWINGS

The features of the present invention that are believed to be novel are set forth with particularity in the appended claims. The invention, together with the objects and advantages thereof, may best be understood by referring to the following description of the presently preferred embodiments taken in conjunction with the accompanying drawings in which:

DETAILED DESCRIPTION OF THE PREFERRED EMBODIMENTS

Figure 1:
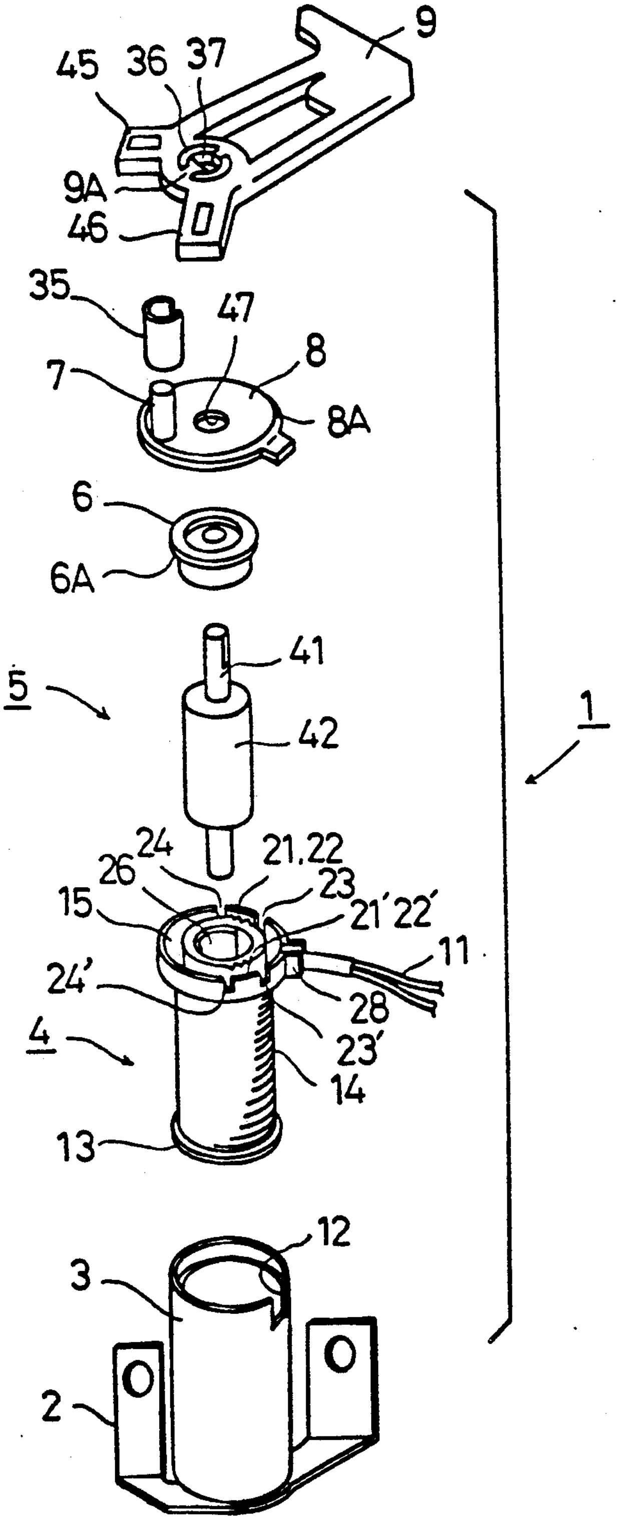
FIG. 1 is an exploded perspective view of the rotary actuator according to this invention.

As illustrated in the drawings, a preferred embodiment of the present invention will be described. As shown in FIG. 1, the rotary actuator 1 contains a housing 3 to which a bracket 2 is welded, a coil unit 4, a rotor 5, a bearing 6 made of a magnetic material, a cover plate 8 and a lever 9.

The housing 3 has a cylindrical shape with a bottom and is made of a magnetic material. Once assembled, the housing 3 cooperates with the cover plate 8 and bearing 6 to function as a yoke for the rotor 5. The housing 3 has a notch 12 at the upper end for allowing wires 11 to pass therethrough.

Figure 6:
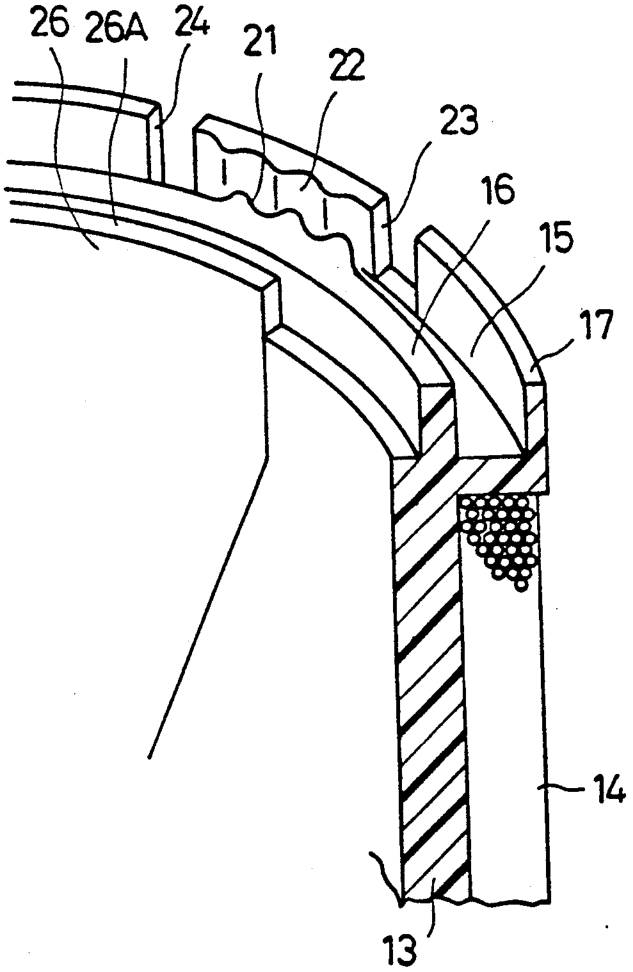
FIG. 6 is a partially cut-away perspective view of the coil bobbin.

The coil unit 4 consists of a substantially cylindrical coil bobbin 13 made of a resin and a stator coil 14 wound therebout. The coil unit is inserted into the housing 3. As shown in FIG. 6, the upper end of the coil bobbin 13 has an inner wall 16 and an outer wall 17 that are integrally formed with a predetermined space therebetween defining a groove 15. The groove 15 provides a space for guiding the wires 11 and for connecting the wires 11 with the stator coil 14.

As shown in FIGS. 1 and 6, the opposing wall surfaces of the inner wall 16 and the outer wall 17 have two pairs of serrated portions 21,22 and 21',22', respectively, and notches 23,24,23',24' are formed on each side of the serrated portions 22 and 22' so that the serrated portions 22,22' can undergo elastic deformation.

Figure 5:
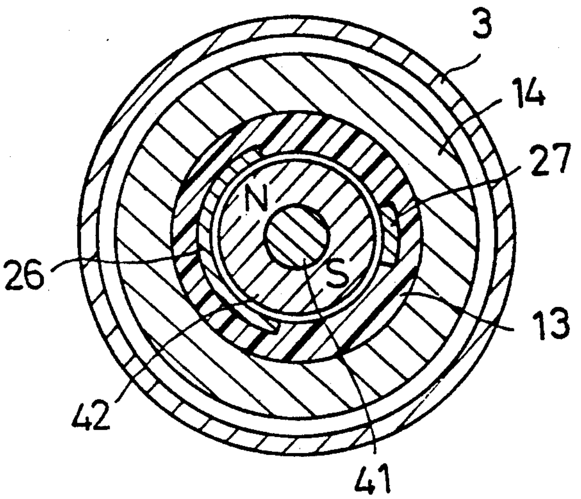
FIG. 5 is a cross section taken along the line V-V in FIG. 4.
Figure 7:
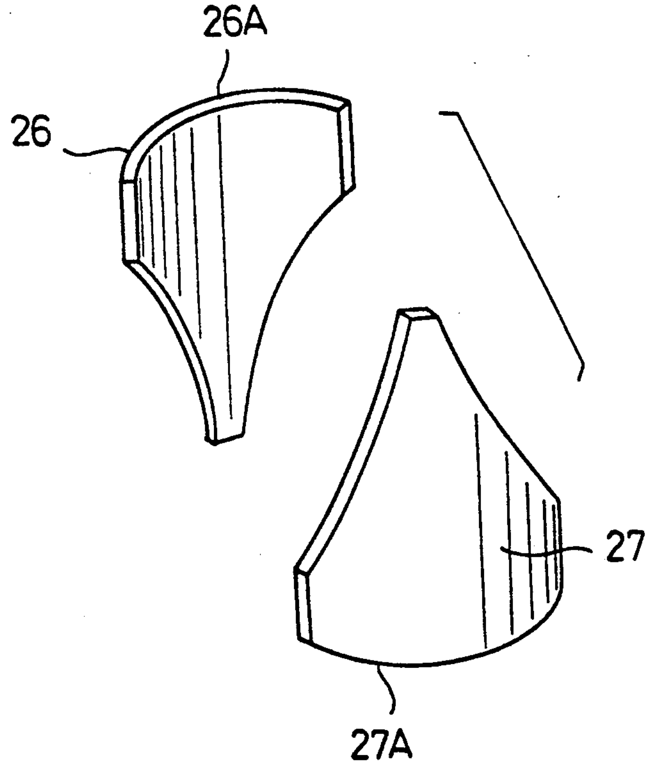
FIG. 7 is a perspective view of a pair of poles.

As shown in FIGS. 5 and 7, a pair of poles 26,27 are secured on the internal surface of the coil bobbin 13. These poles 26,27 are made of curved plates that curve in correspondence to the internal circumference of the bobbin. These poles 26,27 have substantially the same shape and are as shown in FIG. 7. Specifically, they have an enlarged arcuate contact surface 26A,27A, and a narrow contact surface 26B,27B. In the embodiment shown a short longitudinally extending section of the pole adjacent the enlarged contact surface 26A,27A has the same width as the enlarged contact surface. The pole then tapers gradually towards the narrow contact surface 26B,27B. The poles are disposed to oppose each other in such a way that one is inverted relative to the other. The poles 26,27 are secured onto the internal circumference of the coil bobbin 13 so as to constitute portions of the internal circumference, as shown in FIGS. 5 and 6.

It should be noted that the wider contact surface 26A of a first pole 26 is exposed on the upper face of the internal wall of the coil bobbin 13. In contrast, the contact surface 27A of the second pole 27 is likewise exposed on the lower face of the coil bobbin 13, as shown in FIG. 6.

Figure 4:
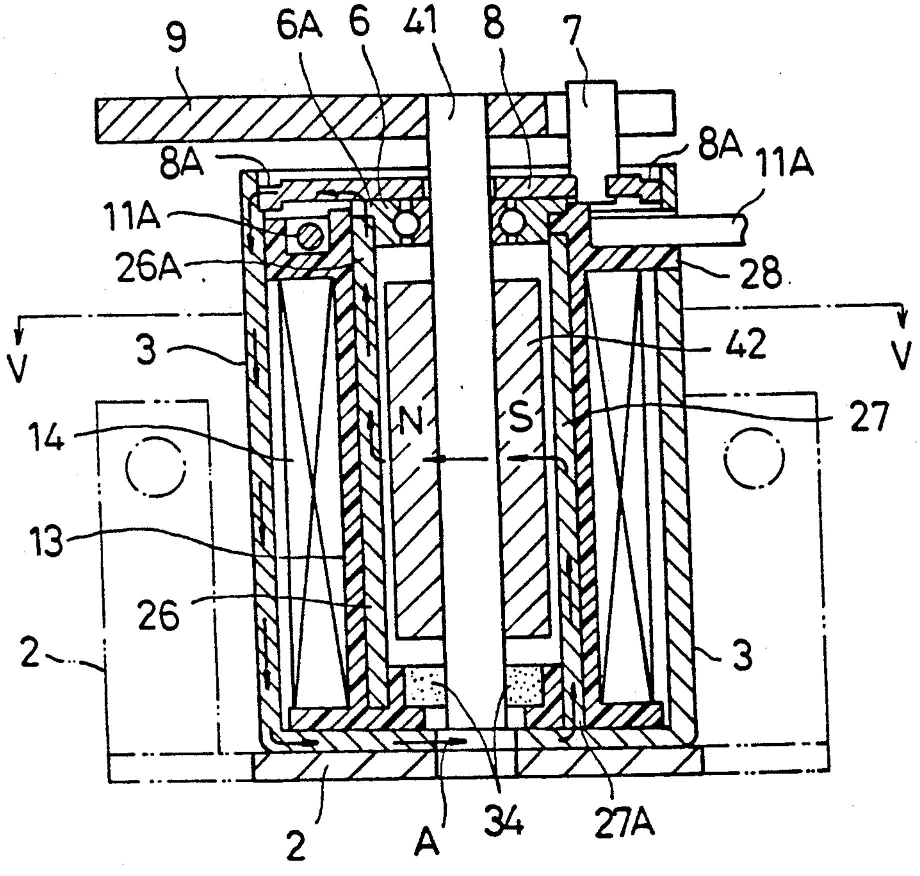
FIG. 4 is a vertical cross-sectional view of the rotary actuator.

As shown in FIG. 4, when the coil unit 4 is incorporated into the housing 3, the contact surface 27A of the pole 27 is brought into contact with the bottom wall of the housing 3. The bearing 6 is fitted in the upper opening of the coil bobbin 13 which is partially in contact with the contact surface 26A of the pole 26. The cover plate 8 is further fitted in the upper opening of the housing 3 in such a way that the lower surface thereof may be contacted with the bearing 6. The housing 3, the bearing 6 and the cover plate 8 thus cooperate to constitute the yoke.

Figure 8:
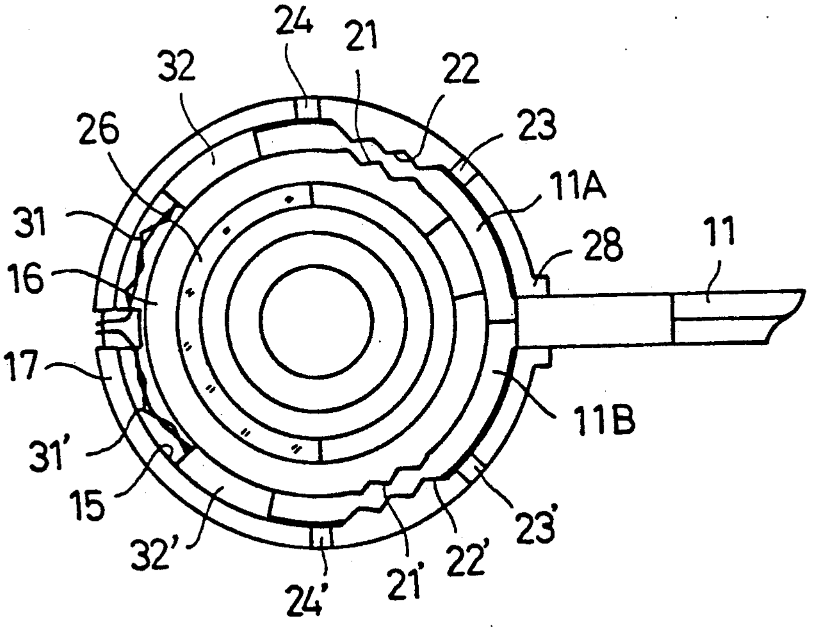
FIG. 8 is a bottom plan view of a coil unit.

As shown in FIG. 8, a pair of wires 11 (first lead wire 11A, second lead wire 11B) are inserted through the lip 28 provided on the outer wall 17 and held respectively in the groove 15 between the serrated portions 21,21′ and the serrated portions 22,22′. These lead wires 11A,11B are connected to the coil ends 31,31′ of the stator coil 14 by connectors 32,32′.

As shown in FIGS. 1 and 4, the rotor 5 consists of a rotary shaft 41 and a cylindrical permanent magnet 42 secured thereon. The permanent magnet 42 is polarized diametrically. In other words, as shown in FIGS. 4 and 5, the portions on the circumference of the permanent magnet 42 opposing to each other with an angle of 180° with the rotary shaft 41 therebetween are magnetized as north (N) and south (S) poles respectively. It should be noted, however, that the permanent magnet 42 is uniformly polarized in the axial direction.

The rotary shaft 41 is rotatably supported by the coil bobbin 13 through the bearing 6 and an second bearing 34.

Figure 2:
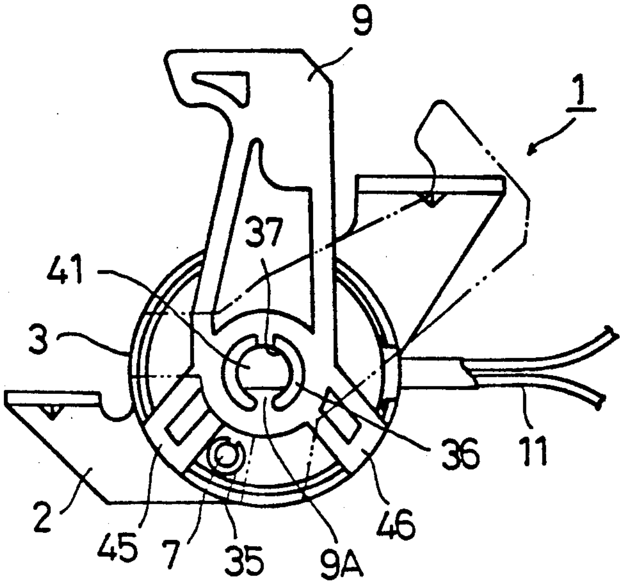
FIG. 2 is a top plan view of the rotary actuator shown in FIG. 1.

As shown in FIGS. 1 and 2, a cylindrical stopper 7 protrudes from the cover plate 8, and a resin sheath 35 covers the circumference of the stopper 7. The cover plate 8 has a rim 8A. The rim 8A and the internal wall surface of the housing 3 define an annular groove, as shown in FIG. 4. An ultraviolet curing resin or the like is poured into the gap between the cover plate 8 and the housing 3 along the groove whereby to enhance the airtightness of the housing 3.

Figure 3:
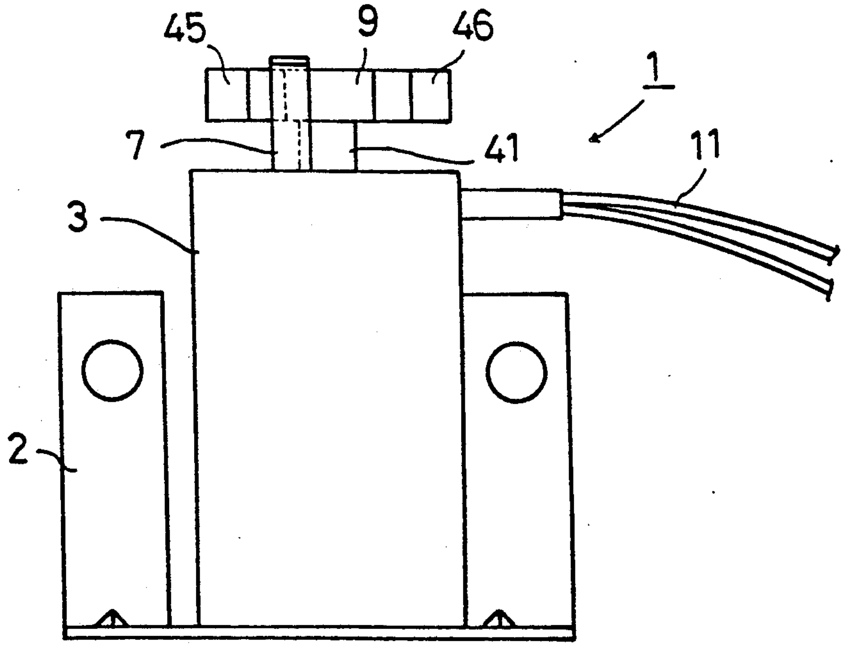
FIG. 3 is a front view of the rotary actuator shown in FIG. 1.

The upper end portion of the rotary shaft 41 penetrates through the center hole 47 of the cover plate 8 and protrudes upward, as shown in FIGS. 2 and 3, and a resin lever 9 is fixed thereto. The lever 9 is a member for transmitting the output from the rotary actuator to other members. It has a D-shaped hole 37 at the proximal end portion thereof. The upper end portion of the rotary shaft 41 has a D-shaped cross section corresponding to the hole 37. Under the engagement of the upper end portion of the rotary shaft 41 and the hole 37, the lever 9 is rotated integrally with the rotary shaft 41.

A C-shaped metal bushing 36 constitutes the majority of the inner circumference of the hole 37. The central portion of the bushing has a reduced height and is engaged by nubs formed integrally with the lever. A protrusion 9A, also formed integrally with the lever 9 extends into the open portion of the C-shaped bushing to form the D shaped opening 37. Accordingly, the metal bushing 36 is easily fabricated without requiring an intricate machining process to form the D-shaped opening.

At the proximal end portion of the lever 9, a pair of tabs 45,46 protrude forming a V shape. Since the stopper 7 is disposed between the two tabs 45,46, the lever 9 and the rotary shaft 41 may be turned within the angle (approx. 45°) defined between the tabs 45 and 46, and their movement is limited by the stopper 7 being brought into abutment against the tabs 45,46. Incidentally, since the tabs 45,46 are molded integrally with the lever 9 and protrusion 9A using a die or the like, the positions of these tabs 45,46 can be designed with high accuracy.

Next, the operation of the rotary actuator will be described referring to FIG. 4. A magnetomotive force is generated upon energization of the stator coil 14 to magnetize, for example, the upper end of the coil bobbin 13 to form a N pole and the lower end thereof to form a S pole. Such energization forms a closed magnetic path "A" as shown with the arrows in FIG. 4. This closed magnetic path A starts from the cover plate 8, continues through the side wall of the housing 3, the bottom wall of the housing 3 and the pole 27. It then diametrically intersects the permanent magnet 42, passes into pole 26 and through the bearing 6 before it returns to the cover plate 8.

The right pole 27 shown in FIG. 4 is magnetized to form a N pole and the left pole 26 forms a S pole in this closed magnetic path A. Thus, the S pole and N pole of the permanent magnet 42 are attracted to the poles 27 and 26, respectively to turn the rotary shaft 41 and the lever 9, (in this case counterclockwise). When one of the tabs 45,46, (for example the tab 45), abuts against the stopper 7, the lever 9 stops rotating.

When the stator coil 14 is energized counterclockwise, the left pole 26 is then magnetized to form a N pole and the right pole 27 forms a S pole. This turns the rotary shaft 41 and the lever 9 in a clockwise manner. When one of the tabs 45,46, for example the tab 46, abuts against the stopper 7, the lever 9 quits rotating. Thus, the rotor 5 is rotated according to the direction that the stator coil 14 is energized.

Winding the stator coil 14 circumferentially around the coil bobbin 13 provides an easier coil winding operation than conventional winding operations where the coil is wound axially. Further, according to this constitution, the number of windings can be increased to increase the magnetomotive force of the stator coil 14 relative to the volume of the coil unit 4.

In this embodiment, no vacancy is present at the center of the stator coil 14. Rather, a pair of poles 26,27 are provided on the internal surface, so that there is no substantial air gap in the closed magnetic path "A" running through the magnetic materials except for the very minor one present between the stator and the rotor. Accordingly, an enhanced magnetic flux density can be obtained to enable full utilization of the magnetomotive force of the stator coil 14. This allows the rotary shaft 41 to output a greater torque.

This embodiment, in which the rotational extremities of the rotary shaft 41 and the lever 9 are regulated by the single stopper 7, allows a simple structure for regulating the rotational range of the lever 9. Further, the rotational range of the lever 9 can be fixed with high accuracy by the angle defined between the pair of tabs 45,46.

In the described embodiment, the wires 11 are securely held in the groove 15 between the serrated portions 21,22 and 21',22' formed on the inner wall 16 and the outer wall 17. Accordingly, the wires 11 and the stator coil 14 are not easily disconnected even if the wires 11 are pulled accidentally.

Moreover, the notches 23,24,23',24' formed on the outer wall 17 impart resilience to the serrated portions 22,22' of the outer wall 17, so that the serrated portions 22,22' exert adequate pressure onto the wires 11 to securely hold them with the corresponding serrated portions 21,21', respectively.

The resin sheath 35 applied on the circumference of the stopper 7 moderates the impact when the tabs 45,46 impinge on the stopper 7 and prevents abrasion of these members.

Although only one embodiment of the present invention has been described herein, it will be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein but may be modified within the scope of the appended claims.

What is claimed is:

1. A rotary actuator comprising:

a cylindrical coil bobbin formed of a non-magnetic material:

a stator coil circumferentially wound about the coil bobbin;

a pair of poles provided within the coil bobbin;

a housing for receiving the coil bobbin, the housing having an upper opening, the housing being spaced apart from a first one of said poles and being magnetically connected to a second one of said poles;

a cover plate covering the upper opening of the housing, the housing and cover plate cooperating to encase the coil bobbin;

a rotary shaft arranged to pass through the coil bobbin;

a bearing for rotatably supporting the rotary shaft; and a cylindrical magnet carried by and integrally rotatable with the rotary shaft, the magnet being diametrically magnetized, the first pole, the cover plate, the housing, the second pole and the cylindrical magnet cooperating to form a closed magnetic path about said stator coil.

2. A rotary actuator as recited in the claim 1 wherein the first pole contacts the bearing at a first end of the coil bobbin and the second pole contacts a bottom wall of the housing at a second end of the coil bobbin.

3. A rotary actuator as recited in the claim 1 wherein the poles are fixed within the coil bobbin so as to form a surface that is substantially continuous with the inner surface of the coil bobbin.

4. A rotary actuator as recited in the claim 1 further comprising:

a lever that is integrally rotatable with the rotary shaft, the lever having a pair of tabs; and a stopper provided on the cover plate, the stopper and tabs cooperating to regulate the rotational range of the rotary shaft.

5. A rotary actuator as recited in the claim 4 further comprising a shock absorber journaled about the stopper for absorbing shocks generated when the stopper strikes one of said tabs.

6. A rotary actuator comprising:

a cylindrical coil bobbin formed of a non-magnetic material;

a stator coil circumferentially wound about the coil bobbin;

a pair of tapered poles provided within the coil bobbin, each tapered pole having opposing enlarged and narrow end surfaces;

a housing for receiving the coil bobbin, the housing having an upper opening, the housing being spaced apart from a first one of said poles and being magnetically connected to the enlarged end of a second one of said poles at a bottom end of the housing;

a cover plate covering the upper opening of the housing, the housing and cover plate cooperating to encase the coil bobbin;

a rotary shaft arranged to pass through the coil bobbin;

a bearing for rotatably supporting the rotary shaft, the bearing being magnetically connected to the cover plate and the enlarged end of the first pole;

a cylindrical magnet carried by and integrally rotatable with the rotary shaft, the magnet being diametrically magnetized, the first pole, the bearing, the cover plate, the housing, the second pole and the cylindrical magnet cooperating to form a closed magnetic path about said stator coil; and a lead wire connected to the stator coil.

7. A rotary actuator as recited in the claim 6 further comprising a groove formed on a first end of the coil bobbin, the groove having an inner wall and an outer wall and accommodating the lead wire, wherein at least one of the inner and outer walls of the groove includes a serrated portion for gripping the lead wire accommodated in the groove.

8. A rotary actuator as recited in claim 7 further comprising notches provided on opposite ends of the serrated portion, such that a wall portion defined by the notches has flexibility.

9. A rotary actuator as recited in the claim 8 wherein the poles are fixed within the coil bobbin so as to form a surface that is substantially continuous with the inner surface of the coil bobbin.

10. A rotary actuator as recited in the claim 6 further comprising:

a lever that is integrally rotatable with the rotary shaft, the lever having a pair of tabs; and a stopper provided on the cover plate, the stopper and tabs cooperating to regulate the rotational range of the rotary shaft.

11. A rotary actuator as recited in the claim 10 further comprising a shock absorber journaled about the stopper for absorbing shocks generated when the stopper strikes one of said tabs.

12. A rotary actuator as recited in the claim 10 wherein:

a first end of the rotary shaft is substantially D-shaped;

the lever includes a substantially D-shaped connecting hole, the D-shape being formed by a metal ring bush and a protrusion integrally formed with the lever; and the D-shaped rotary shaft end engages with the connecting hole of the lever.

13. A rotary actuator comprising:

a cylindrical coil bobbin formed of a non-magnetic material;

a stator coil circumferentially wound about the coil bobbin;

a pair of tapered poles provided within the coil bobbin, each tapered pole having opposing enlarged and narrow end surfaces;

a housing for receiving the coil bobbin, the housing having an upper opening, the housing being spaced apart from a first one of said poles and being magnetically connected to the enlarged end of a second one of said poles at a bottom end of the housing;

a cover plate covering the upper opening of the housing, the housing and cover plate cooperating to encase the coil bobbin;

a rotary shaft arranged to pass through the coil bobbin;

a bearing for rotatably supporting the rotary shaft, the bearing being magnetically connected to the cover plate and the enlarged end of the first pole;

a cylindrical magnet carried by and integrally rotatable with the rotary shaft, the magnet being diametrically magnetized, the first pole, the bearing, the cover plate, the housing, the second pole and the cylindrical magnet cooperating to form a closed magnetic path about said stator coil;

a lead wire connected to the stator coil;

a groove formed on a first end of the coil bobbin, the groove having an inner wall and an outer wall and accommodating the lead wire, wherein at least one of the inner and outer walls of the groove includes a serrated portion for gripping the lead wire accommodated in the groove;

a lever that is integrally rotatable with the rotary shaft, the lever having a pair of tabs;

a stopper provided on the cover plate, the stopper and tabs cooperating to regulate the rotational range of the rotary shaft; and a shock absorber journaled about the stopper for absorbing shocks generated when the stopper strikes one of said tabs.

14. A rotary actuator comprising:

a cylindrical coil bobbin formed on a non-magnetic material;

a stator coil circumferentially wound about the coil bobbin;

a pair of tapered poles provided within the coil bobbin on opposing sides of the coil bobbin, each tapered pole having opposing enlarged and narrow end surfaces;

a yoke magnetically connected to the poles, the yoke being arranged to encase to coil bobbin and wherein the enlarged end of a first one of said poles contacts the yoke at a first end of the coil bobbin and the enlarged end of a second pole contacts the yoke at a second end of the coil bobbin;

a rotary shaft rotationally supported by the yoke, the rotary shaft being arranged to pass through the coil bobbin;

a cylindrical magnet carried by and integrally rotatable with the rotary shaft, the magnet being diametrically magnetized, the poles, the yoke and the cylindrical magnet cooperating to form a closed magnetic path about said stator coil;

a lever that is integrally rotatable with the rotary shaft, the lever having a pair of tabs; and stopper means for cooperating with said tabs to regulate the rotational range of the rotary shaft to at most 180°.

15. A rotary actuator as recited in claim 14 wherein said a stopper is provided on the cover plate.

16. A rotary actuator as recited in the cliam 14 wherein the yoke includes:

a housing for receiving the coil bobbin, the housing having an upper opening;

a plate covering the upper opening of the housing; and a bearing rotatably supporting the rotary shaft, the bearing being magnetically connected to the cover plate, the poles, the bearing, the cover plate, the housing and the cylindrical magnet cooperating to form a closed magnetic path about said stator coil.

* * * * *